(12) United States Patent
Krinke, II et al.

(10) Patent No.: US 8,380,951 B1
(45) Date of Patent: Feb. 19, 2013

(54) DYNAMICALLY UPDATING BACKUP CONFIGURATION INFORMATION FOR A STORAGE CLUSTER

(75) Inventors: Thomas L. Krinke, II, Forest Lake, MN (US); James P. Ohr, St. Paul, MN (US)

(73) Assignee: Symantec Corporation, Mountain View, CA (US)

( * ) Notice: Subject to any disclaimer, the term of this patent is extended or adjusted under 35 U.S.C. 154(b) by 944 days.

(21) Appl. No.: 12/243,248

(22) Filed: Oct. 1, 2008

(51) Int. Cl.
*G06F 12/00* (2006.01)

(52) U.S. Cl. ........ 711/162; 711/161; 711/202; 711/205; 711/207; 711/221; 711/E12.002

(58) Field of Classification Search .................. 711/161, 711/162, 202, 205, 207, 221, E12.002
See application file for complete search history.

(56) References Cited

U.S. PATENT DOCUMENTS

| | | | |
|---|---|---|---|
| 6,922,762 B2 * | 7/2005 | Hirakawa et al. | 711/162 |
| 7,447,857 B2 | 11/2008 | Lyon | |
| 7,461,102 B2 | 12/2008 | Derk | |
| 7,493,349 B2 | 2/2009 | Nguyen | |
| 7,587,402 B2 | 9/2009 | Muhlestein | |
| 7,702,867 B2 | 4/2010 | Coombs | |
| 2006/0053272 A1 * | 3/2006 | Roth et al. | 713/1 |

OTHER PUBLICATIONS

"Symantec Backup Exec™ 12 for Windows Servers—Administrator's Guide," Symantec Corp., 2007.

* cited by examiner

*Primary Examiner* — Midys Rojas
(74) *Attorney, Agent, or Firm* — Meyertons, Hood, Kivlin, Kowert & Goetzel, P.C.

(57) ABSTRACT

Various embodiments of a system and method for updating backup configuration information used by backup software to perform backup operations for a storage cluster are described. Backup configuration information specifying a configuration of the storage cluster may be stored. Subsequently, a particular change to the configuration of the storage cluster may be automatically detected. In response to detecting the particular change, the backup configuration information may be automatically updated to reflect the particular change to the configuration of the storage cluster. Subsequent backup operations may then be performed using the updated backup configuration information.

19 Claims, 7 Drawing Sheets

DYNAMICALLY UPDATING BACKUP CONFIGURATION INFORMATION FOR A STORAGE CLUSTER

BACKGROUND OF THE INVENTION

1. Field of the Invention

This invention relates to backup software for a storage cluster that includes a plurality of nodes that host storage volumes, and a plurality of backup storage devices. More particularly, the invention relates to a system and method for dynamically updating the backup configuration information used by the backup software in response to automatically detecting changes in the configuration of the storage cluster.

2. Description of the Related Art

Computer-executable backup software is often used to backup data in order to protect it against hardware failure, accidental deletion, or data corruption. The data may be stored in one or more file system volumes in the form of files. Backup software may operate to backup a volume either at the file level by individually backing up each file in the volume on a file-by-file basis, or at the block level by creating a block-level backup image of the volume (typically including metadata for managing the volume as well as the file data).

Backup software can be used to backup data stored on standalone computers, as well data stored in storage clusters that include a plurality of nodes. For example, each node in a storage cluster may host one or more storage volumes that need to be backed up. The storage cluster may include one or more separate backup storage devices onto which the volume data from the nodes is backed up. In order to perform backup operations for a storage cluster, the backup software needs to know various aspects of the cluster's configuration, such as the cluster topology (e.g., which nodes and backup storage devices are present in the cluster, and how they are interconnected), as well as other information, such as which volumes are implemented in the cluster and which node hosts each volume.

SUMMARY

Various embodiments of a system and method for updating backup configuration information used by backup software to perform backup operations for a storage cluster are described herein. The storage cluster may include a plurality of nodes and a plurality of backup storage devices. Each node may host one or more storage volumes. The backup software may execute to perform various backup operations to backup the storage volumes from the nodes to the backup storage devices.

According to one embodiment of the method, backup configuration information specifying a configuration of the storage cluster may be stored. Subsequently, a particular change to the configuration of the storage cluster may be automatically detected. In response to detecting the particular change, the backup configuration information may be automatically updated to reflect the particular change to the configuration of the storage cluster. One or more backup operations may then be performed using the updated backup configuration information to backup one or more of the storage volumes from one or more of the nodes to one or more of the backup storage devices.

In some embodiments, automatically detecting the particular change to the configuration of the storage cluster may comprise registering with one or more software modules to receive notifications of changes to the configuration of the storage cluster. After registering with the one or more software modules, a notification indicating the particular change to the configuration of the storage cluster may be received. The backup configuration information may then be updated in response to the notification.

BRIEF DESCRIPTION OF THE DRAWINGS

A better understanding of the invention can be obtained when the following detailed description is considered in conjunction with the following drawings, in which.

Figure 1:
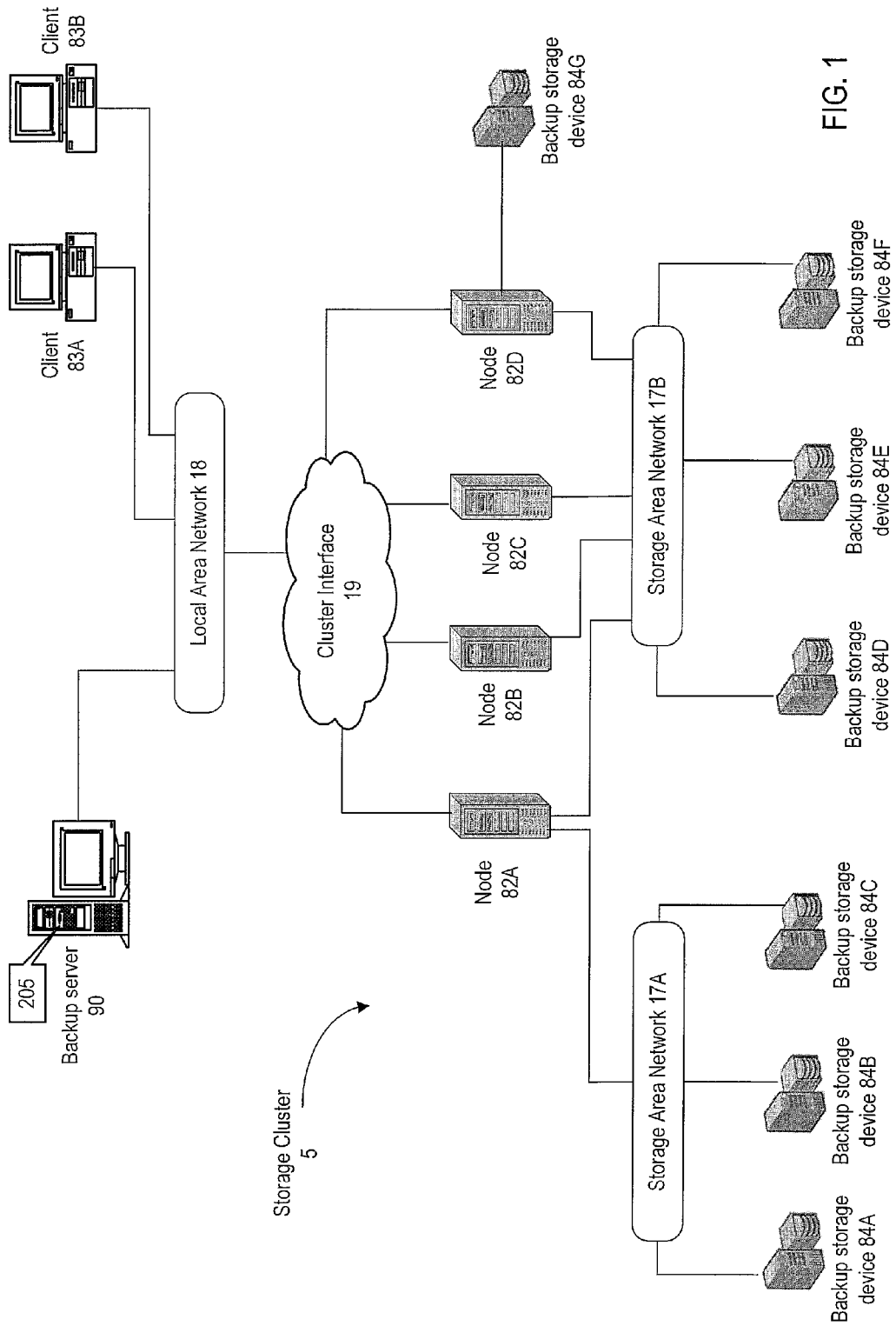
FIGS. 1 and 2 illustrate examples of a system including a storage cluster having a plurality of nodes and a plurality of backup storage devices, where each node hosts one or more storage volumes.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for updating the backup configuration information used by a backup software application to perform backup operations for a storage cluster are described herein. The storage cluster may include a plurality of nodes and a plurality of backup storage devices. Each node may host one or more storage volumes. The backup software may control backup operations for the storage cluster, e.g., to backup the volumes from each of the nodes onto one or more of the backup storage devices.

Briefly described, the method may operate to perform a discovery process to discover backup configuration information used to backup the data from the nodes. For example, the backup configuration information may specify the topology of the storage cluster, such as which nodes are present, which backup storage devices are present, and which nodes are connected to which backup storage devices. The backup configuration information may also include other types of information needed to backup data from the nodes, such as which storage volumes are present, and which volumes are hosted on which nodes.

The backup configuration information discovered in the discovery process may be stored and used by the backup software when performing backup operations. In addition, the backup software may be operable to automatically detect changes to the configuration of the storage cluster and update the backup configuration information to reflect the changes. For example, in some embodiments the backup software may register with one or more software modules to automatically receive notifications of changes to the configuration of the storage cluster. In other embodiments the backup software may automatically detect changes to the configuration of the storage cluster in other ways, such as by periodically polling one or more of the devices in the storage cluster.

Examples of storage cluster configuration changes which the backup software may automatically detect include changes such as a new node or backup storage device being added to the storage cluster, an existing node or backup storage device being removed from the storage cluster, a connection between a particular node and backup storage device being added or removed, a new volume being added, an existing volume being deleted, an existing volume being moved from one node to another node, etc.

In response to detecting a particular change to the configuration of the storage cluster, the backup software may update the stored backup configuration information to reflect the change. This may enable the backup configuration information to remain current as the configuration of the storage cluster dynamically changes over time. Thus, the backup software may have up-to-date backup configuration information that enables backup operations to be performed correctly and efficiently.

In various embodiments the method described above may provide an efficient technique for keeping the backup configuration information used by the backup software up to date as the configuration of the storage cluster changes. For example, in some embodiments the discovery process in which the topology information and other backup configuration information is discovered may be relatively expensive to perform in terms of time and/or bandwidth, especially for large clusters with many nodes and backup storage devices. However, the discovery process may only need to be performed once, and thereafter the backup software may be automatically notified of changes to the configuration of the storage cluster, so that the stored backup configuration information can be efficiently updated.

Referring now to FIG. 1, an example of a system which may utilize the method is illustrated. The system includes a plurality of nodes 82 and a plurality of backup storage devices 84. The plurality of nodes and the plurality of backup storage devices 84 are collectively referred to herein as a storage cluster. In this example the storage cluster includes four nodes 82A-82D and seven backup storage devices 84A-84G. However, in other embodiments the storage cluster may include different numbers of nodes 82 and backup storage devices 84.

Each node 82 in the storage cluster may host one or more volumes. As used herein, the term volume refers to a set of files in which data is stored. A volume is also referred to herein as a storage volume. A node 82 "hosting" a volume means that the node 82 enables software applications to access the volume, e.g., in order to read data from and/or write data to the files in the volume. The software applications that access the volume may execute on other devices in the system and may communicate with the node 82 through a local area network 18 to access the volume. For example, as illustrated in FIG. 1, the system may include one or more client computers 83 which execute software applications that access volumes hosted by the nodes 82. For example, in some embodiments the client computers 83A and 83B may be application server computers which execute database applications, electronic commerce applications, or other types of software applications which use files stored in volumes hosted by various nodes 82.

The system also includes a backup server computer 90 on which backup software 205 executes to perform or control backup operations for the storage cluster. For example, as described below, the backup software 205 may communicate with the nodes 82 and instruct particular nodes 82 to backup their data onto particular backup storage devices 84. In other embodiments the backup software 205 may be distributed across multiple backup server computers. In some embodiments the backup server computer 90 may operate primarily to perform or manage backup operations for the storage cluster, while in other embodiments the backup server computer 90 may be a general purpose server computer that also performs various other functions to manage the storage cluster.

In various embodiments each node 82 may be any type of device configured to host storage volumes for access by software applications which execute on other devices in the system. In some embodiments, the nodes 82 may be devices specialized for or dedicated to providing file sharing or volume hosting services for other devices in the system, e.g., for the client computers 82. Examples of nodes 82 include network attached storage (NAS) devices, network appliances, intelligent storage devices, etc. In various embodiments the nodes 82 may include various types of storage on which the volume files are stored, such as one or more disk drives. In some embodiments each node 82 may include a plurality of high performance and high capacity disk drives which enable the node 82 to store a large amount of data and serve the data quickly over the local area network 18 to the client computers 82.

As illustrated in FIG. 1, in some embodiments the backup software 205 executing on the backup server computer 90 and the software applications executing on the client computers 83 may communicate with the nodes 82 through a virtual interface referred to as the cluster interface 19.

In various embodiments the nodes 82 may be coupled to the backup storage devices 84 in any of various ways. For example, in some embodiments the nodes 82 may communicate with the backup storage devices 84 through one or more storage area networks (SANs) 17. In the example illustrated in FIG. 1, the system includes two SANs 17A and 17B. The node 82A is configured to access both the SAN 17A and the SAN 17B, whereas the nodes 82B, 82C, and 82D are only configured to access the SAN 17B. In this example, the node 82D is also configured to access the backup storage device 84G without communicating through a SAN. For example, the backup storage device 84G may be coupled directly to the node 82D through a communication bus, for example.

It is noted that FIG. 1 is provided as an example, and in various other embodiments the nodes 82 and backup storage devices 84 may be interconnected according to any desired architecture and may use any of various technologies to communicate, such as direct attached storage, iSCSI storage, or through fibre channel networks or any of various other types of networks.

In various embodiments each backup storage device 84 may be any type of device operable to store data. Examples of backup storage devices 84 include disk storage units (e.g., devices including one or more disk drives), tape storage devices (e.g., devices operable to store data on tape cartridges), optical storage devices (e.g., devices operable to store data on optical media), flash memory storage devices, etc.

Also, in various embodiments the backup server computer 90 and the client computers 83 may be coupled to and may communicate with the nodes 82 in any of various ways. For example, the backup server computer 90 and/or the client computers 83 may be coupled to the nodes 82 through any type of network or combination of networks. For example, the network may include any type or combination of local area network (LAN) (e.g., the LAN 18 in FIG. 1), a wide area network (WAN), wireless networks, an Intranet, the Internet, etc. Examples of local area networks include Ethernet networks, Fiber Distributed Data Interface (FDDI) networks, and token ring networks. Also, each device may each be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Referring again to FIG. 1, the node 82A can potentially access any of the backup storage devices 84A-F through the SANs 17A and 17B, and the nodes 82 B-D can potentially access any of the backup storage devices 84D-F through the SAN 17B. However, in order to actually communicate with a particular backup storage device, a particular node may first need to establish a connection (e.g., a virtual connection or communication link) to the particular backup storage device. According to the terminology used herein, a particular node 82 is said to have a connection to a particular backup storage device 84 at a given time if the particular node 82 is currently able to send data to the particular backup storage device 84, e.g., in order to backup the data from a volume hosted on the particular node 82.

Figure 2:
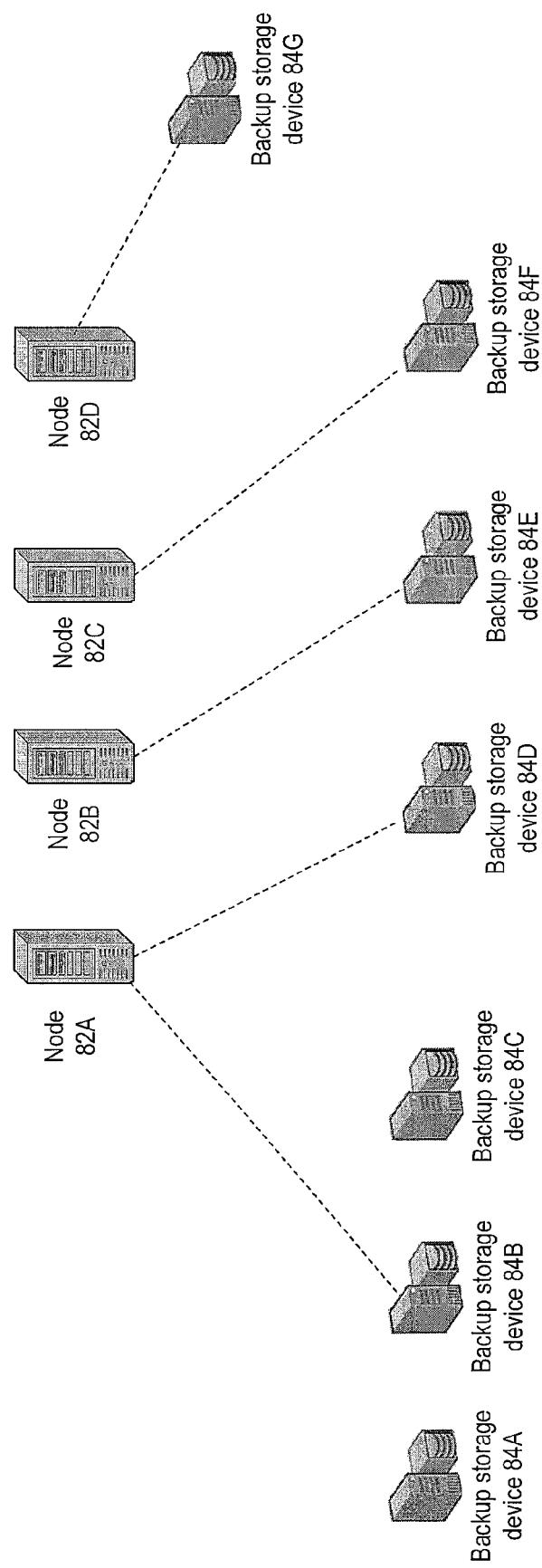

For example, FIG. 2 illustrates a particular point in time in which the node 82A has established connections to the backup storage devices 84B and 84D; the node 82B has established a connection to the backup storage device 84E; the node 82C has established a connection to the backup storage device 84F; and the node 82D has established a connection to the backup storage device 84G. Thus, at the point in time illustrated in FIG. 2, the node 82A is currently able to backup its volume data to either one of the backup storage devices 84B and 84D, and the other nodes 82 are similarly able to backup their volume data to the respective backup storage devices 84 to which they currently have connections.

In some embodiments the backup software 205 may perform or control a backup operation by instructing a particular node 82 to backup one or more of its volumes to a particular backup storage device 84. Thus, the backup software 205 may need to know which backup storage devices 84 are currently connected to the particular node 82 (e.g., which backup storage devices 84 the particular node 82 has established connections with). For example, in FIG. 2 the backup software 205 may select one of the backup storage devices 84B or 84D to which the node 82A is currently connected and may instruct the node 82A to backup one or more of the volumes currently hosted on the node 82A to the selected backup storage device. However, the connections between nodes 82 and backup storage devices 84 may change over time. The method described below may enable the backup software 205 to dynamically update backup configuration information which specifies the current connections between nodes 82 and backup storage devices 84 as the connections change over time. The method may also enable the backup configuration information to be dynamically updated to reflect various other aspects of the storage cluster's configuration, as discussed below.

Figure 3:
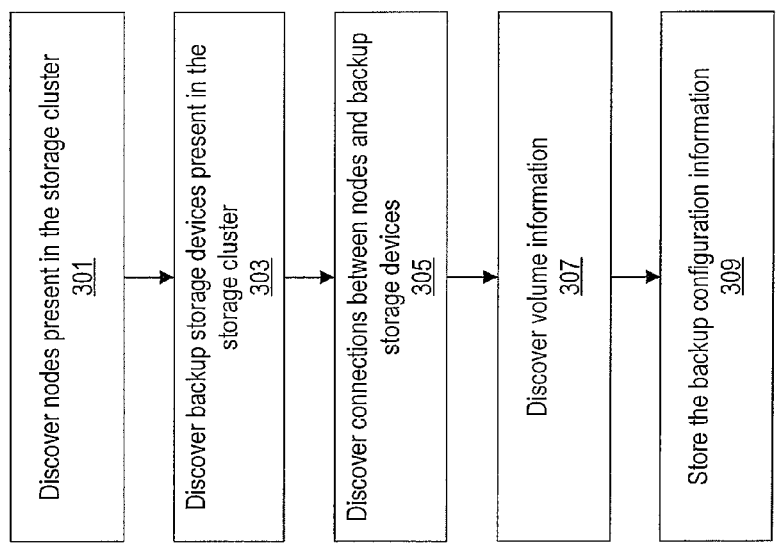
FIG. 3 is a flowchart diagram illustrating one embodiment of a method for performing a discovery process to create backup configuration information used by backup software to perform backup operations for the storage cluster.

The backup configuration information used by the backup software 205 may be initially discovered through a discovery process, e.g., a process performed or initiated by the backup software 205 in order to determine information about the topology of the storage cluster and other aspects of the storage cluster's configuration. In various embodiments the discovery process may operate to determine any kind of information regarding the configuration of the storage cluster. FIG. 3 is a flowchart diagram illustrating one embodiment of the discovery process.

In block 301, the nodes present in the storage cluster may be automatically discovered. In various embodiments, any node discovery techniques known in the art may be used to discover which nodes are currently present and functioning in the storage cluster. As one example, the backup software 205 may send a node discovery message over one or more networks to the storage cluster, where the node discovery message is delivered to each node on the network and requests the nodes to reply by identifying themselves. As another example, the backup software 205 may communicate with one or more other server computers in the cluster to request information specifying which nodes are currently in the storage cluster.

In block 303, the backup storage devices present in the storage cluster may be automatically discovered. In various embodiments, any of various techniques may be used to discover which backup storage devices are currently present and functioning in the cluster. For example, the backup software 205 may send a discovery message to which the backup storage devices reply, or may communicate with one or more other server computers or with the nodes to request information specifying which backup storage devices are currently in the storage cluster.

In block 305, the backup software 205 may operate to automatically determine which nodes are currently connected to which backup storage devices. For example, in some embodiments the backup software 205 may communicate with each respective node in the storage cluster and request it to reply with a list of backup storage devices with which the respective node can currently use for backup. In another embodiment the backup software 205 may communicate with each respective backup storage device in the storage cluster and request it to reply with a list of nodes with which the respective backup storage device can communicate. In another embodiment the backup software 205 may retrieve information from another server or database that specifies which nodes are currently connected to which backup storage devices.

In block 307, the backup software 205 may operate to automatically determine information regarding storage volumes implemented in the storage cluster. In particular, the backup storage device 205 may determine a list of volumes that need to be backed up and may determine which node hosts each volume. In some embodiments the cluster may provide a mapping technique, e.g., through a proprietary application programming interface (API) or through an extension of a standardized interface such as Network Data Management Protocol (NDMP), to map a file system path into volumes and relate these volumes to nodes. For example, the mapping technique may enable the backup software 205 to discover information regarding each volume, such as: the mount point or relative path at which the volume is mounted in the networked file system; a globally unique volume ID for the volume; and the node currently managing the volume.

Thus, during the discovery process the backup software 205 may discover backup configuration information needed for correctly backing up the data from the nodes to the backup storage devices. The backup configuration information may include information specifying the topology of the storage cluster, such as which nodes are present, which backup storage devices are present, and which nodes are connected to which backup storage devices. The backup configuration information may also include information regarding the data to be backed up, such as a list of file system volumes implemented in the storage cluster, and which volumes are hosted on which nodes.

In block 309 the backup software 205 may store the backup configuration information discovered in the discovery process, e.g., on non-volatile storage (e.g., a disk drive) or in dynamic memory of the backup server 90. In various embodiments the backup configuration information may be structured or stored in any of various ways, e.g., in one or more data structures, files, or databases.

Once the backup configuration information has been discovered and stored, the backup software 205 may be able to perform backup operations using the backup configuration information. The term "backup operation" refers to any operation in which data is backed up from one or more of the nodes to one or more of the backup storage devices. In some embodiments the backup software 205 may perform a backup operation by communicating with a node to instruct the node to backup one or more of the node's volumes to a selected backup storage device.

In some embodiments the backup software 205 may include an administration tool that enables an administrator of the cluster to specify a desired time schedule for the backup operations, and the backup software 205 may automatically initiate the backup operations according to the time schedule. As one example, the administrator may specify one group of volumes to be backed up daily and another group of volumes to be backed up weekly.

It is possible for the configuration of the storage cluster to change over time, so that the backup configuration information initially discovered no longer reflects the current configuration of the storage cluster. Continuing to use the original backup configuration information after the configuration of the storage cluster has changed may result in failures or inefficiencies in the backup operations. As one example, if a volume has moved from one node to another node then an error may occur if the backup software 205 attempts to access the volume on the first node. As another example, if a particular node becomes disconnected from a particular backup storage device then an error may occur if the backup software 205 instructs the particular node to communicate with the particular backup storage device to back up its data.

Figure 4:
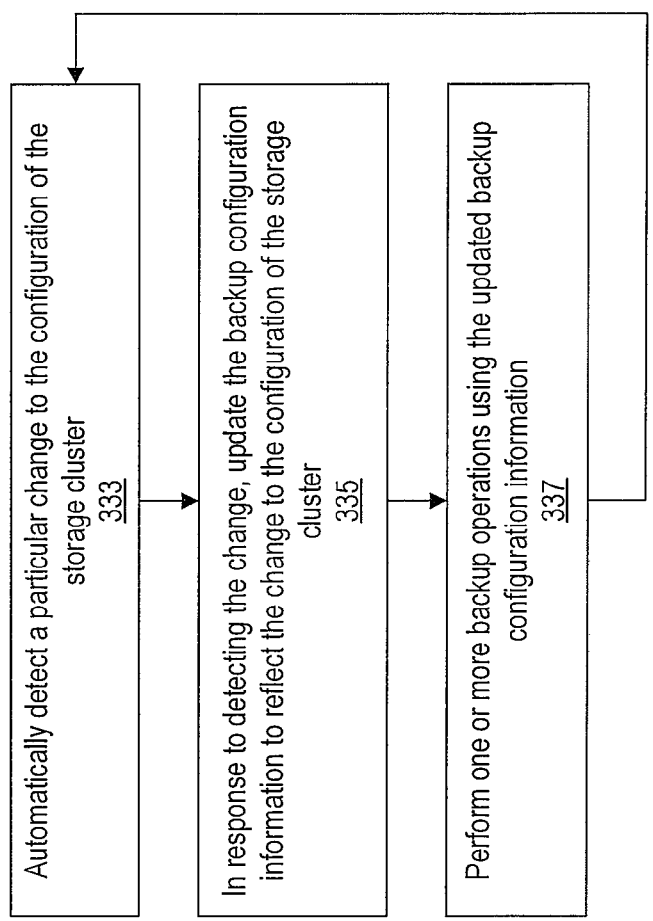
FIG. 4 is a flowchart diagram illustrating one embodiment of a method for automatically updating the backup configuration information in response to changes in the configuration of the storage cluster.

FIG. 4 is a flowchart diagram illustrating one embodiment of a method for automatically updating the backup configuration information in response to changes in the configuration of the storage cluster. In some embodiments the method of FIG. 4 may be implemented by the backup software 205.

In block 333, the backup software 205 may automatically detect a particular change to the configuration of the storage cluster. In response to detecting the change, the backup software 205 may update the backup configuration information to reflect the change to the configuration of the storage cluster, as indicated in block 335. The backup software 205 may then perform one or more backup operations using the updated backup configuration information, as indicated in block 337.

In various embodiments the backup software 205 may be configured to automatically detect changes in the configuration of the storage cluster using any of various techniques. The changes to the configuration of the storage cluster may be programmatically detected by the backup software 205, e.g., without user input specifying the changes. In some embodiments the changes may also be automatically detected by the backup software 205 in real time, e.g., within seconds or microseconds after the changes occur.

Figure 5:
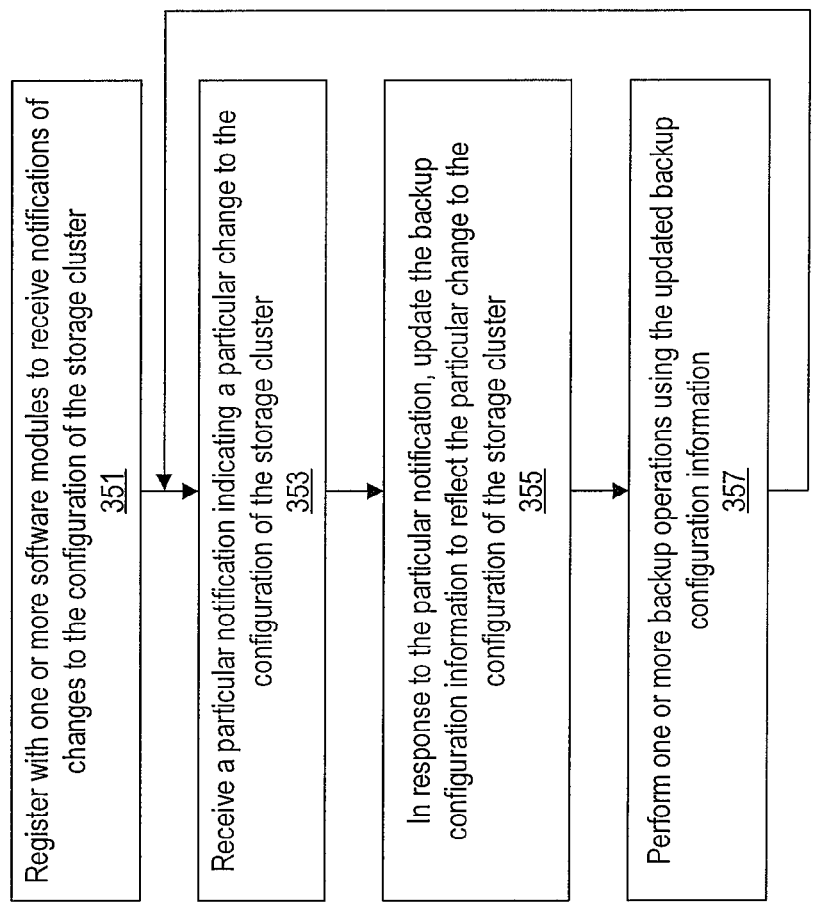
FIG. 5 is a flowchart diagram illustrating a more particular embodiment of the method of FIG. 4.

FIG. 5 is a flowchart diagram illustrating a more particular embodiment of the method of FIG. 4, in which the backup software 205 automatically detects changes to the configuration of the storage cluster by receiving notifications from other software modules.

In block 351, the backup software 205 may register with one or more software modules to receive notifications of changes to the configuration of the storage cluster. For example, each respective software module of the one or more software modules may be operable to automatically detect when a particular type of configuration change affecting backup operations for the storage cluster occurs. Registering with the respective software module may cause the respective software module to automatically notify the backup software 205 when the particular type of configuration change occurs. For example, the respective software module may notify the backup software 205 in real time in response to the configuration change.

For each respective software module of the one or more software modules, registering with the respective software module may comprise calling an application programming interface (API) of the respective software module or storing (or requesting other software to store) registration information specifying that the respective software module should notify the backup software 205 when the particular type of change in the configuration of the storage cluster occurs.

Each software module of the one or more software modules is a respective portion of software that executes on one or more of the devices in the storage cluster. Each of the software modules may execute on any device in the storage cluster and may be a part of or may be associated with any of various types of software, such as operating system software, device management software, network software, file system software, volume manager software, client-side backup software, etc.

In various embodiments, each of the one or more software modules may be operable to detect any of various kinds of changes in the configuration of the storage cluster, e.g., any kind of configuration change that affects the backup operations performed for the storage cluster. Examples of configuration changes that may be automatically detected by various software modules in the storage cluster include: a new node joining the storage cluster; a new backup storage device joining the storage cluster; an existing node being removed from the storage cluster; an existing backup storage device being removed from the storage cluster; a particular node establishing a connection to a particular backup storage device; a particular node becoming disconnected from a particular backup storage device; a new file system volume being added in the storage cluster; an existing file system volume being deleted from the storage cluster; an existing file system volume being moved from one node to another node, etc.

Thus, in various embodiments, any of various types of software modules executing on various devices in the storage cluster may automatically detect any of various kinds of configuration changes in the storage cluster and may notify the backup software 205 of the change in response to detecting the change. This may enable the backup software 205 to be notified in response to dynamic configuration changes which affect backup operations performed by the backup software 205.

In various embodiments, a software module may notify the backup software 205 of a configuration change in any of various ways. In some embodiments, the software module may asynchronously notify the backup software 205 of the configuration change. In some embodiments, notifying the backup software 205 of the change may comprise programmatically calling a function or application programming interface (API) of the backup software 205 to inform the backup software 205 of the change. As another example, notifying the backup software 205 of the change may comprise sending a message over a network to the backup server 90 on which the backup software 205 executes to inform the backup software 205 of the change.

Referring again to FIG. 5, in block 353 the backup software 205 may receive a particular notification indicating a particular change to the configuration of the storage cluster, e.g., may receive the particular notification from a particular software module with which the backup software 205 registered in block 351.

As indicated in block 355, in response to the particular notification, the backup software 205 may update the backup configuration information to reflect the particular change to the configuration of the storage cluster. For example, updating the backup configuration information may include one or more of: changing part or all of the backup configuration information previously stored; adding new backup configuration information to the previously stored backup configuration information; or deleting part of the previously stored backup configuration information.

As indicated in block 357, the backup software 205 may then perform one or more backup operations using the updated backup configuration information. Since the backup configuration information has been updated to reflect the current configuration of the cluster after it was changed, the updated backup configuration information may enable the backup software 205 to perform the one or more backup operations correctly and efficiently.

As indicated by the flowchart arrow returning from block 357 to block 353, the above-described process of receiving notifications of changes to the configuration of the storage cluster and updating the backup configuration information in response to the notifications may be performed multiple times such that the backup configuration information is kept up to date as the configuration of the storage cluster changes over time.

The above-described method may not only enable subsequent backup operations that are initiated after the backup configuration information has been dynamically updated to be performed correctly, but may also enable automatic recovery for backup operations that fail as a result of the storage cluster being changed. For example, suppose that a large volume is being backed up, but before the backup operation completes, the volume is dynamically moved to a different node, e.g., such that the volume is no longer hosted by the original node. The backup software 205 may be notified of this configuration change. For example, the backup software 205 may have previously registered with a volume manager module on the original node or on the new node which notifies the backup software 205 that the volume has been re-located to the new node. Thus, the backup software 205 may gracefully terminate the current backup operation and communicate with the new node to automatically begin a new backup operation to backup the volume, e.g., because the updated volume information specifies that the volume is now hosted by the new node.

In other embodiments the backup software 205 may automatically receive a notification from a software module indicating a change to the configuration of the storage cluster without previously registering to receive such notifications. For example, in some embodiments each node in the storage cluster may execute software configured to automatically discover the backup software 205 on the backup server 90 when the node joins the storage cluster and communicate with the backup software 205 to inform the backup software 205 that the node has joined the storage cluster. In other embodiments the backup software 205 may include one or more polling software modules which execute to periodically communicate with various devices in the cluster in order to detect whether the configuration of the cluster has changed. For example, in some embodiments the backup software 205 may include a polling module operable to periodically send a status message to each node in the cluster. Thus, for example, the backup software 205 may automatically detect that a particular node is no longer in the cluster if the particular node fails to respond to the status message.

As a few example uses of the method described above according to various embodiments, consider the following examples.

EXAMPLE 1

The backup software 205 registers with a software module in order to request to receive automatic notifications when a particular node establishes a new connection to a new backup storage device or closes one of its current connections to a backup storage device. For example, in some embodiments the backup software 205 may register with a Simple Network Management Protocol (SNMP) software module on the node or on another computer in the system which is operable to detect such changes and notify the backup software 205 in response.

Thus, if the particular node established a new connection to a new backup storage device then the backup software 205 may receive a notification of this change and update its stored backup configuration information accordingly. The updated backup configuration information may be used to optimize backup operations involving the particular node. Suppose for example, that in the example of FIG. 2, the node 82B becomes connected to the backup storage device 84D, and the node 82C becomes connected to the backup storage device 84E, so that the node 82B now has connections to both the backup storage device 84D and the backup storage device 84E, and the node 82C now has connections to both the backup storage device 84E and the backup storage device 84F. In some embodiments the backup software 205 may attempt to backup data in parallel from multiple nodes 82, e.g., by backing up multiple volumes in parallel from different nodes 82. If the backup storage device 84E is currently in use to backup data from the node 82C then the backup software 205 can determine from the updated backup configuration information that the backup storage device 84D can still be used to backup data from the node 82B. Thus, the updated backup configuration information may enable the backup software 205 to determine that a data backup from the node 82B can be initiated immediately without waiting for the data backup from the node 82C to finish.

EXAMPLE 2

When a new node joins the storage cluster (e.g., boots up or re-joins the storage cluster after a previous network failure), software executing on the new node or executing on another server computer in the storage cluster automatically notifies the backup software 205 that the new node has joined the storage cluster. As one example, client-side backup software executing on the new node may be operable to communicate with the backup software 205 executing on the backup server 90. As another example, the new node may include network software operable to communicate with network software on the backup server 90, where the network software on the backup server 90 then notifies the backup software 205 that the new node has joined the storage cluster.

The backup software 205 may also be notified of which volumes are hosted by the new node, or may initiate communication with the new node in order to determine which volumes are hosted by the new node. The backup configuration information may be updated with a list of volumes that need to be backed up from the new node, and the backup software 205 may then initiate a backup operation to backup the volumes accordingly.

EXAMPLE 3

The backup software 205 periodically polls the nodes in the storage cluster to determine their current status. The backup software 205 determines that a particular node is no longer active in the storage cluster, and updates the backup configuration information accordingly. Thus, any backup operations scheduled to backup data from the particular node will not be attempted until the particular node re-joins the storage cluster, thus preventing backup failures and logged errors. Also, if the backup software 205 discovers that a particular backup storage device has left the storage cluster then the backup software 205 does not attempt to use the particular backup storage device in any backup operations until the particular backup storage device re-joins the storage cluster.

Figure 6:
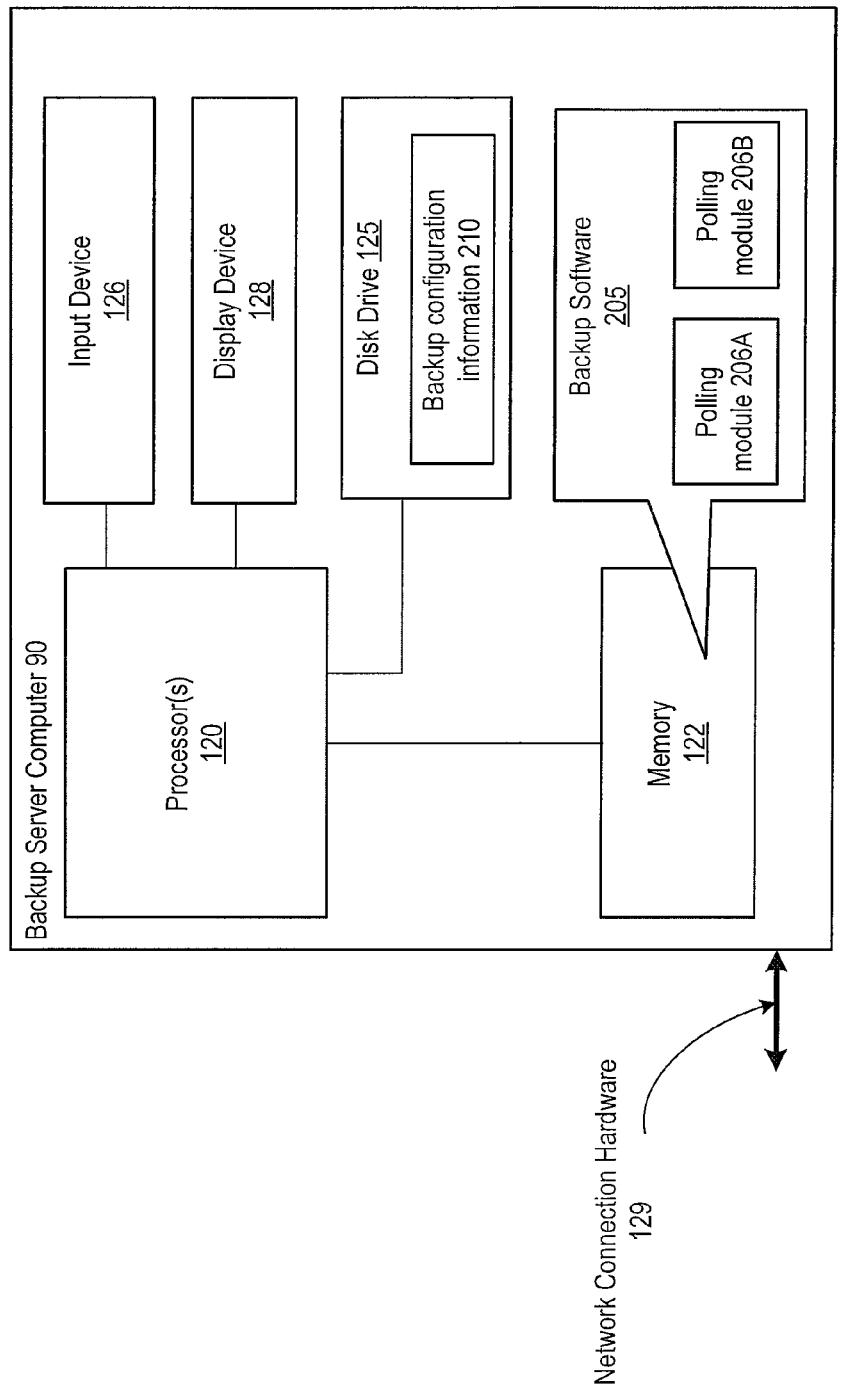
FIG. 6 illustrates an example embodiment of a backup server computer which executes the backup software.

Referring now to FIG. 6, an example embodiment of the backup server computer 90 is illustrated. It is noted that FIG. 6 is provided as an example, and in other embodiments the backup server 90 may be implemented in various other ways.

In this example, the backup server 90 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the backup software 205. The processor 120 may execute the backup software 205 to perform the functions described herein. In particular, the backup software 205 may execute to automatically detect changes in the configuration of the storage cluster. For example, in some embodiments the backup software 205 may register with other software modules in order to receive automatic notifications of changes in the configuration of the storage cluster. In other embodiments, the backup software 205 may include one or more polling modules, such as the polling modules 206A and 206B which execute to periodically communicate with other devices in the system in order to detect changes to the storage cluster. The memory 122 may also store other software which operates in conjunction with or which is used by the backup software 205, such as operating system software, file system software, network communication software, etc.

In various embodiments the backup software 205 may be implemented in any of various ways and may have any desired software architecture. In some embodiments the backup software 205 may be distributed across multiple backup server computers. Also, in some embodiments the backup software 205 may execute in conjunction with client-side backup software on the nodes in order to perform backup operations.

Referring again to FIG. 6, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the backup server 90 may include multiple processors 120.

The backup server 90 may include one or more hard disk drives 125 or other storage devices for storing data in a non-volatile manner. In some embodiments the backup configuration information may be stored on one or more of the hard disk drives 125, e.g., as illustrated by backup configuration information 210 in FIG. 6. In other embodiments the backup configuration information may be stored in the memory 122.

The backup server 90 may also include one or more input devices 126 for receiving user input, e.g., from an administrator of the cluster. The input device(s) 126 may include any of various types of input devices, such as keyboards, keypads, microphones, or pointing devices (e.g., a mouse or trackball). The backup server 90 may also include one or more output devices 128 for displaying output to the administrator. The output device(s) 128 may include any of various types of output devices or display devices, such as LCD screens or monitors, CRT monitors, etc. The backup server 90 may also include network connection hardware 129 through which the backup server 90 connects to a network, e.g., in order to communicate with other devices in the system.

Figure 7:
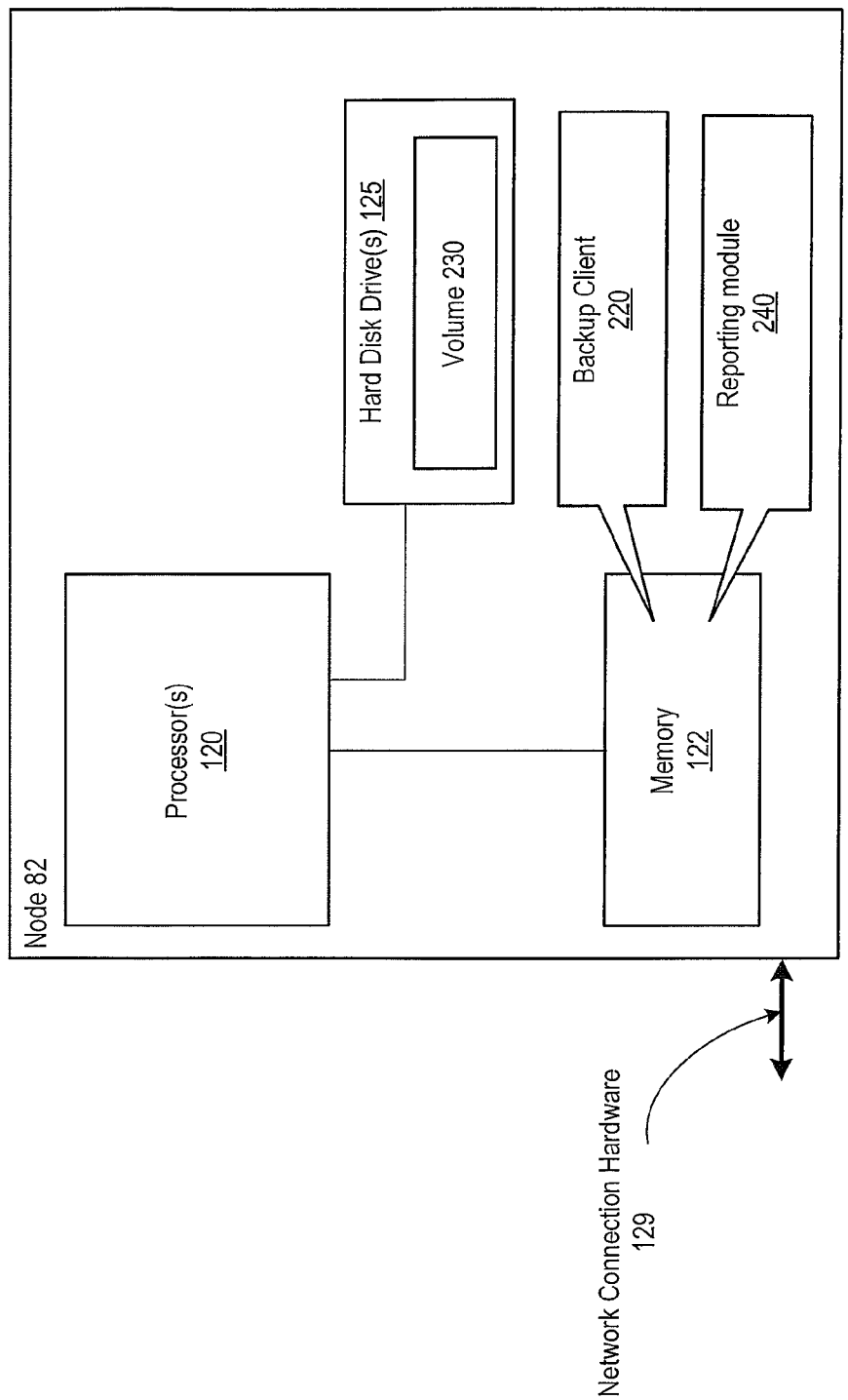
FIG. 7 illustrates an example embodiment of a node in the storage cluster.

FIG. 7 illustrates an example embodiment of a node 82. FIG. 7 represents one example of a node 82, and in other embodiments the node 82 may be implemented in various other ways. The node 82 may include various elements similar to the elements of the backup server 90, e.g., one or more processors 120 coupled to memory 122.

The memory 122 may store software executed by the processor(s) 120, such as backup client software 220 which communicates with the backup software 205 on the backup server 90 and communicates with the backup storage devices 84 to backup the volume 230, which may be stored on one or more hard disk drives 125 or other storage devices included in or coupled to the node 82. In some embodiments the memory 122 may also store one or more reporting modules 240. For example, the reporting module(s) 240 may execute to notify the backup software 205 on the backup server 90 in response to various configuration changes regarding the node 82, such as when the node 82 begins hosting a new volume or stops hosting a volume, when the node 82 establishes or closes a connection to a backup storage device 84, when the node 82 joins the storage cluster, etc.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable to:
store backup configuration information specifying information for backing up a clustered storage system, wherein the backup configuration information specifies: a) a plurality of nodes in the clustered storage system, wherein each node includes one or more processors; b) for each respective node of the plurality of nodes, one or more storage volumes hosted by the respective node, wherein each respective storage volume includes a plurality of files; c) a plurality of backup storage devices coupled by a network to the plurality of nodes; and d) connections among the plurality of backup storage devices and the plurality of nodes;
in response to automatically detecting a particular change to the clustered storage system, update the backup configuration information to reflect the particular change to the clustered storage system; and
perform a first backup operation using the updated backup configuration information to backup one or more of the storage volumes from one or more of the nodes to one or more of the backup storage devices, wherein the first backup operation operates to backup each file of the one or more storage volumes to the one or more backup storage devices, wherein in performing the first backup operation the program instructions are executable to select, from the updated backup configuration information, one or more of: the one or more storage volumes, the one or more nodes, or the one or more backup storage devices to use in the first backup operation.

2. The non-transitory computer-accessible storage medium of claim 1, wherein automatically detecting the particular change to the clustered storage system comprises:
registering with one or more software modules to receive notifications of changes to the clustered storage system; and
after registering with the one or more software modules, receiving a first notification indicating the particular change to the clustered storage system;
wherein the backup configuration information is updated in response to the first notification.

3. The non-transitory computer-accessible storage medium of claim 2,
wherein the program instructions are executable by a first computer;
wherein the one or more software modules execute on one or more computers other than the first computer;
wherein receiving the first notification comprises receiving a notification via a network from a particular computer other than the first computer.

4. The non-transitory computer-accessible storage medium of claim 2,
wherein receiving the first notification comprises receiving an asynchronous notification from a first software module of the one or more software modules.

5. The non-transitory computer-accessible storage medium of claim 1,
wherein the particular change to the clustered storage system is automatically detected in response to periodically communicating with the plurality of nodes to detect changes to the clustered storage system.

6. The non-transitory computer-accessible storage medium of claim 1,
wherein the particular change to the clustered storage system is automatically detected while a particular backup operation is being performed, wherein the particular change causes the particular backup operation to fail;
wherein performing the first backup operation comprises automatically re-starting the particular backup operation using the updated backup configuration information.

7. The non-transitory computer-accessible storage medium of claim 1,
wherein the backup configuration information indicates that a volume is hosted on a first node of the plurality of nodes;
wherein automatically detecting the particular change to the clustered storage system comprises automatically detecting that the volume has been moved to a second node of the plurality of nodes;
wherein updating the backup configuration information comprises updating the backup configuration information to indicate that the volume is hosted on the second node;
wherein performing the first backup operation comprises communicating with the second node to backup the volume in response to determining that the updated backup configuration information indicates that the volume is hosted on the second node.

8. The non-transitory computer-accessible storage medium of claim 1,
wherein the backup configuration information indicates that a plurality of volumes are implemented in the storage system;
wherein automatically detecting the particular change to the clustered storage system comprises automatically detecting that a new volume has been added to the plurality of volumes;
wherein updating the backup configuration information comprises updating the backup configuration information to indicate that the new volume has been added to the plurality of volumes;
wherein performing the first backup operation comprises backing up the new volume in response to determining that the updated backup configuration information indicates that the new volume has been added to the plurality of volumes.

9. The non-transitory computer-accessible storage medium of claim 1,
wherein the backup configuration information indicates that a first node of the plurality of nodes is connected to a first backup storage device of the plurality of storage devices;
wherein the program instructions are further executable to perform a particular backup operation before automatically detecting the particular change, wherein the particular backup operation causes the first node to communicate with the first backup storage device to backup data onto the first backup storage device;
wherein automatically detecting the particular change to the clustered storage system comprises automatically detecting that the first backup storage device is no longer connected to the first node;
wherein updating the backup configuration information comprises updating the backup configuration information to indicate that the first backup storage device is no longer connected to the first node;
wherein the first backup operation causes the first node to communicate with a particular backup storage device other than the first backup storage device to backup data onto the particular backup storage device.

10. The non-transitory computer-accessible storage medium of claim 1,
wherein automatically detecting the particular change to the clustered storage system comprises automatically detecting that a new node has been added to the plurality of nodes;
wherein updating the backup configuration information comprises updating the backup configuration information to indicate that the new node has been added to the plurality of nodes;
wherein performing the first backup operation comprises backing up data from the new node in response to determining that the updated backup configuration information indicates that the new node has been added to the plurality of nodes.

11. The non-transitory computer-accessible storage medium of claim 1,
wherein the backup configuration information indicates that the plurality of nodes includes a first node;
wherein the program instructions are further executable to perform a particular backup operation before automatically detecting the particular change, wherein performing the particular backup operation comprises communicating with the first node to backup data from the first node;
wherein automatically detecting the particular change to the clustered storage system comprises automatically detecting that the first node has been removed from the plurality of nodes;
wherein updating the backup configuration information comprises updating the backup configuration information to indicate that the first node has been removed from the plurality of nodes;
wherein the first backup operation does not attempt to communicate with the first node since the updated backup configuration information indicates that the first node has been removed from the plurality of nodes.

12. A system comprising:
one or more processors; and
memory storing program instructions;
wherein the program instructions are executable by the one or more processors to:
store backup configuration information specifying information for backing up a storage cluster, wherein the backup configuration information specifies: a) a plurality of nodes in the storage cluster, wherein each node includes one or more processors; b) for each respective node of the plurality of nodes, one or more storage volumes hosted by the respective node, wherein each respective storage volume includes a plurality of files; c) a plurality of backup storage devices coupled by a network to the plurality of nodes; and d) connections among the plurality of backup storage devices and the plurality of nodes;
in response to automatically detecting a particular change to the storage cluster, update the backup configuration information to reflect the particular change to the storage cluster; and
perform a first backup operation using the updated backup configuration information to backup one or more of the storage volumes from one or more of the nodes to one or more of the backup storage devices, wherein the first backup operation operates to backup each file of the one or more storage volumes to the one or more backup storage devices, wherein in performing the first backup operation the program instructions are executable by the one or more processors to select, from the updated backup configuration information, one or more of: the one or more storage volumes, the one or more nodes, or the one or more backup storage devices to use in the first backup operation.

13. The system of claim 12, wherein automatically detecting the particular change to the storage cluster comprises:
registering with one or more software modules to receive notifications of changes to the storage cluster; and
after registering with the one or more software modules, receiving a first notification indicating the particular change to the storage cluster;
wherein the backup configuration information is updated in response to the first notification.

14. The system of claim 13,
wherein receiving the first notification comprises receiving an asynchronous notification from a first software module of the one or more software modules.

15. The system of claim 12,
wherein the particular change to the storage cluster is detected while a particular backup operation is being performed, wherein the particular change to the storage cluster causes the particular backup operation to fail;
wherein performing the first backup operation comprises automatically re-starting the particular backup operation using the updated backup configuration information.

16. A method comprising:
storing backup configuration information specifying information for backing up a clustered storage system, wherein the backup configuration information specifies:
a) a plurality of nodes in the clustered storage system, wherein each node includes one or more processors; b) for each respective node of the plurality of nodes, one or more storage volumes hosted by the respective node, wherein each respective storage volume includes a plurality of files; c) a plurality of backup storage devices coupled by a network to the plurality of nodes; and d) connections among the plurality of backup storage devices and the plurality of nodes;
in response to automatically detecting a particular change to the clustered storage system, updating the backup configuration information to reflect the particular change to the clustered storage system; and
performing a first backup operation using the updated backup configuration information to backup one or more of the storage volumes from one or more of the nodes to one or more of the backup storage devices, wherein the first backup operation operates to backup each file of the one or more storage volumes to the one or more backup storage devices, wherein performing the first backup operation comprises selecting, from the updated backup configuration information, one or more of: the one or more storage volumes, the one or more nodes, or the one or more backup storage devices to use in the first backup operation.

17. The method of claim 16, wherein automatically detecting the particular change to the clustered storage system comprises:
registering with one or more software modules to receive notifications of changes to the clustered storage system; and
after registering with the one or more software modules, receiving a first notification indicating the particular change to the clustered storage system;

wherein the backup configuration information is updated in response to the first notification.

18. The method of claim 17,
wherein receiving the first notification comprises receiving an asynchronous notification from a first software module of the one or more software modules.

19. The method of claim 16,
wherein the particular change to the clustered storage system is detected while a particular backup operation is being performed, wherein the particular change to the clustered storage system causes the particular backup operation to fail;
wherein performing the first backup operation comprises automatically re-starting the particular backup operation using the updated backup configuration information.

* * * * *